United States Patent
Shin et al.

(10) Patent No.: US 12,002,955 B2
(45) Date of Patent: Jun. 4, 2024

(54) CATHODE ACTIVE MATERIAL FOR LITHIUM SECONDARY BATTERY

(71) Applicant: L&F CO., LTD., Daegu (KR)

(72) Inventors: Jaeshin Shin, Daegu (KR); Sun Hye Lim, Daegu (KR); Jeongsoo Son, Yeongdong-gun (KR); Jihye Ku, Gyeongju-si (KR); Sung Kyun Chang, Daegu (KR); Sang Hoon Jeon, Daegu (KR); Ji Sun An, Daegu (KR)

(73) Assignee: L&F CO., LTD., Daegu (KR)

( * ) Notice: Subject to any disclaimer, the term of this patent is extended or adjusted under 35 U.S.C. 154(b) by 567 days.

(21) Appl. No.: 17/294,447

(22) PCT Filed: Nov. 29, 2018

(86) PCT No.: PCT/KR2018/014898
§ 371 (c)(1),
(2) Date: May 17, 2021

(87) PCT Pub. No.: WO2020/111318
PCT Pub. Date: Jun. 4, 2020

(65) Prior Publication Data
US 2022/0013774 A1  Jan. 13, 2022

(30) Foreign Application Priority Data
Nov. 29, 2018 (KR) .................. 10-2018-0150320

(51) Int. Cl.
*H01M 4/525* (2010.01)
*H01M 4/04* (2006.01)
*H01M 4/36* (2006.01)
*H01M 4/505* (2010.01)
*H01M 10/0525* (2010.01)

(52) U.S. Cl.
CPC ......... *H01M 4/525* (2013.01); *H01M 4/0471* (2013.01); *H01M 4/364* (2013.01); *H01M 4/366* (2013.01); *H01M 4/505* (2013.01); *H01M 10/0525* (2013.01)

(58) Field of Classification Search
None
See application file for complete search history.

(56) References Cited

U.S. PATENT DOCUMENTS

2004/0175621 A1 * 9/2004 Iriyama .................. H01M 4/36
204/192.15

FOREIGN PATENT DOCUMENTS

| KR | 10-2014-0093529 | 7/2014 |
| KR | 10-2017-0046921 | 5/2017 |
| KR | 10-2017-0049424 | 5/2017 |
| KR | 10-2018-0090211 | 8/2018 |
| KR | 10-2018-0121267 | 11/2018 |

* cited by examiner

Primary Examiner — Alix E Eggerding
(74) Attorney, Agent, or Firm — LEX IP MEISTER, PLLC

(57) ABSTRACT

Disclosed are a cathode active material for a lithium secondary battery including a core containing lithium composite metal oxide, and a coating layer disposed on the core, containing a mixture of lithium oxide, tungsten oxide, boron oxide and phosphorus oxide, and having an amorphous phase, and a lithium secondary battery including the same.

13 Claims, No Drawings

CATHODE ACTIVE MATERIAL FOR LITHIUM SECONDARY BATTERY

TECHNICAL FIELD

The present invention relates to a cathode active material for a lithium secondary battery including a core containing lithium composite metal oxide, and a coating layer disposed on the core, containing a mixture of lithium oxide, tungsten oxide, boron oxide and phosphorus oxide, and having an amorphous phase.

BACKGROUND ART

Lithium secondary batteries are used in various fields, such as mobile devices, energy storage systems and electric vehicles, due to their high energy density and voltage, long cycle life, and low self-discharge rate.

However, the lithium secondary batteries have a problem in that the lifespan thereof rapidly decreases upon repeated charging and discharging. In particular, this problem is more serious in long-lifespan or high-voltage batteries. This is caused by decomposition of the electrolyte or deterioration of the active material due to factors such as moisture or lithium byproducts inside the battery, and an increase in the internal resistance of the battery. In particular, when the cathode active material itself is seriously deteriorated, the elution of elements constituting the cathode active material increases, and as a result, the battery life is rapidly deteriorated, or the battery cannot be used at a high voltage.

In an attempt to solve these problems, methods of forming a surface treatment layer on the surface of a cathode active material have been proposed. However, among these methods, an aluminum-based surface treatment layer, which is recognized as having stability at high voltage and in the electrolyte, has a problem in that it is difficult to uniformly coat the entire active material therewith because it is coated in a crystalline state on the surface of active material particles and a problem in that resistance is increased due to the intrinsic crystallinity of the aluminum-based compound. In addition, boron-based coatings are uniformly coated in a glassy state, and do not interfere with the movement of lithium ions moving from the cathode active material to the electrolyte, but they have a problem in that they become incapable of acting as coating layers upon long-term reaction with an electrolyte because they react with moisture.

Furthermore, lithium secondary batteries require various characteristics according to the use environment of the devices or appliances to which they are applied, especially require sufficient output characteristics at low temperatures, when mounted on devices or appliances used in environments with great temperature changes, or in cold areas.

There are examples of using tungsten in a cathode active material, which is one of the main components constituting lithium secondary batteries, in order to improve the low-temperature characteristics thereof. However, the cathode active materials developed to date include the form of $Li_xW_yO_z$, which is a compound of lithium, tungsten, and oxygen. For this reason, the cathode active materials are problematic because they are not coated on the core in a crystallized state, but are separately present on the outside of the core, or are not uniformly coated on the surface thereof.

Accordingly, there is increasing need for the development of a novel cathode active material capable of improving the performance of lithium secondary batteries while solving the above problems.

DISCLOSURE

Technical Problem

Therefore, the present invention has been made to solve the above and other technical problems that have yet to be resolved.

Therefore, as a result of extensive research and various experimentation, the present inventors have developed a novel cathode active material in which an amorphous coating layer containing a mixture of lithium oxide, tungsten oxide, boron oxide and phosphorus oxide is applied onto the surface of a core, and found that the cathode active material suppresses a phenomenon in which a coating material is present in a crystalline state outside the core, rather than on the surface of the core, and significantly reduces the amount of lithium byproducts remaining on the surface, produced during the process of manufacturing the core through uniform coating, and improves the lifespan characteristics and high-voltage characteristics of lithium secondary batteries, especially the low-temperature characteristics thereof. Based on this finding, the present invention has been completed.

Technical Solution

In accordance with one aspect of the present invention, provided is a cathode active material for a lithium secondary battery including a core containing lithium composite metal oxide, and a coating layer disposed on the core, containing a mixture of lithium oxide, tungsten oxide, boron oxide and phosphorus oxide, and having an amorphous phase.

The cathode active material for a lithium secondary battery according to the present invention has a structure in which the mixture of lithium oxide, tungsten oxide, boron oxide and phosphorus oxide is contained in the coating layer having an amorphous phase, thereby forming a uniform coating on the surface of the core and remarkably reducing the amount of lithium byproducts remaining on the surface and improving the lifespan characteristics and high-voltage characteristics of the secondary battery, and in particular, greatly improving the output characteristics at low temperatures.

In a specific embodiment, the lithium composite metal oxide may include one or more transition metals, and may have a layered crystal structure that can be used at high capacity and high voltage, and specifically may be a substance represented by the following Formula 1:

$$Li[Li_xM_{1-x-y}D_y]O_{2-a}Q_a \qquad (1)$$

wherein M includes at least one transition metal element that is stable in a 4- or 6-coordination structure;

D includes at least one element selected from alkaline earth metal, transition metal, and non-metal as a dopant;

Q includes at least one anion; and $0 \leq x \leq 0.1$, $0 \leq y \leq 0.1$, $0 \leq a \leq 0.2$.

For reference, when D is a transition metal, this transition metal is excluded from the transition metal defined for M.

In a preferred embodiment,

M includes at least two elements selected from the group consisting of Ni, Co, and Mn;

D includes at least one element selected from the group consisting of Al, W, Si, V, B, Ba, Ca, Zr, Ti, Mg, Ta, Nb and Mo; and Q includes at least one element selected from F, S and P.

The core may have an average particle diameter (D50) of 1 to 50 μm, for example, but is not particularly limited thereto.

The lithium composite metal oxide forming the core having the composition described above may be prepared by a method known in the art, and thus a description thereof will be omitted herein.

One of the features of the present invention is that a mixture of lithium oxide, tungsten oxide, boron oxide and phosphorus oxide is contained in the amorphous-phase coating layer. This definition includes the case where the coating layer having the amorphous phase is formed solely of a mixture of lithium oxide, tungsten oxide, boron oxide and phosphorus oxide.

As will be described later, lithium oxide, tungsten oxide, boron oxide, and phosphorus oxide are adhered to the surface of the core in an amorphous phase or a glassy phase at a low firing temperature for surface treatment of the core, which is a lithium composite metal oxide. In this process, lithium oxide, boron oxide or the like may act as a coating agent to facilitate the process of attaching tungsten oxide onto the core.

In a specific embodiment, the coating layer may be represented by the composition of the following Formula 2.

$$\alpha W_x O_y \text{-} \beta B_m O_n \text{-} \gamma P_v O_w \text{-} \delta Li_2 O \qquad (2)$$

wherein requirements of $0<\alpha\leq 2$, $0<\beta\leq 2$, $0<\gamma\leq 2$, $0<\delta\leq 2$, and $1\leq x\leq 2$, $2\leq y\leq 4$, $1\leq m\leq 2$, $3\leq n\leq 5$, $1\leq v\leq 3$, $4\leq w\leq 8$ are satisfied.

In Formula 2, $\alpha$, $\beta$, $\gamma$ and $\delta$ are set on a weight basis.

$Li_2O$, which is a preferred example of lithium oxide, can improve meltability or formability by lowering the high-temperature viscosity of glassy oxide. In addition, $Li_2O$ has excellent lithium ion conductivity and does not react with an electrolyte or hydrogen fluoride derived from the electrolyte during charging/discharging. Such $Li_2O$ may be formed by oxidation upon firing of a lithium compound added before firing, may be added as $Li_2O$ itself, or may be derived from LiOH, $Li_2CO_3$ or the like, which are lithium byproducts remaining on the surface of the core during the process of producing the core including lithium composite metal oxide.

The lithium oxide may be contained in the coating layer in an amount of 2 parts by weight or less, preferably 0.01 to 2 parts by weight, more preferably 0.1 to 1 part by weight, based on 100 parts by weight of the lithium composite metal oxide constituting the core. When the content of lithium oxide is excessively low, undesirably, there is a problem in that it is difficult to achieve uniform coating as described above, and when the content is excessively high, undesirably, the lithium oxide is additionally coated on other oxides such as tungsten oxide, thus inhibiting the coating effects of these oxides, or thickening the coating to thereby act as resistance in the battery.

In a specific embodiment, the tungsten oxide may be $WO_3$.

The tungsten oxide is present in the coating layer in an amorphous phase or a glassy phase, thereby reducing charge transfer resistance (RCT resistance) and suppressing agglomeration that occurs when separately present as a crystalline phase. Meanwhile, lithium oxide, boron oxide, and the like facilitate adhesion of tungsten oxide such as $WO_3$ to the surface of the core due to excellent coating formability thereof.

The tungsten oxide may be contained in the coating layer in an amount of 2 parts by weight or less, preferably 0.1 to 2 parts by weight, and more preferably 0.1 to 1.1 parts by weight based on 100 parts by weight of the lithium composite metal oxide constituting the core. When the content of tungsten oxide is excessively low, undesirably, it may be difficult to exert the effects as described above, and when the content of tungsten oxide is excessively high, undesirably, it does not form a coat, but is separately present outside the core, impeding contact between the cathode active material and the conductive material and binder in the electrode state, acting as a factor that hinders the movement of electrons in the electrode, and preventing desired output characteristics from being achieved.

In a specific embodiment, the boron oxide may be $B_2O_3$ and/or $B_2O_5$, preferably $B_2O_3$.

The boron oxide may be present as an ionic conductor, and is capable of easily forming an amorphous phase. In addition, the boron oxide can improve coating formability together with lithium oxide to thereby improve the adhesion of the tungsten oxide to the core during heat treatment (firing) for coating.

The boron oxide may be contained in the coating layer in an amount of 2 parts by weight or less, preferably 0.1 to 2 parts by weight, and more preferably 0.1 to 1 part by weight, based on 100 parts by weight of the lithium composite metal oxide constituting the core. When the content of boron oxide is excessively low, undesirably, it may be difficult to achieve the effects as described above, and when the content is excessively high, undesirably, it may act as a resistance on the surface and cause a problem of capacity reduction.

In a specific embodiment, the phosphorus oxide may be $P_2O_5$.

The phosphorus oxide reduces the amount of lithium byproducts, which are generated during the process of preparing the lithium composite metal oxide for the core and remain on the surface of the core, and contributes to the surface coverage effect. Moreover, it also serves to suppress the generation of fine powder in the firing process.

The phosphorus oxide may be contained in the coating layer in an amount of 2 parts by weight or less, preferably 0.1 to 2 parts by weight, and more preferably 0.1 to 1 part by weight, based on 100 parts by weight of lithium composite metal oxide constituting the core. When the content of phosphorus oxide is excessively small, undesirably, it may be difficult to reduce the amount of remaining lithium byproducts and achieve uniform coating, as described above, and when the content of phosphorus oxide is excessively high, undesirably, unwanted large particles may be generated due to agglomeration of the active material during coating firing.

As such, the certain combination of lithium oxide, tungsten oxide, boron oxide and phosphorus oxide in the coating layer can remarkably improve lifespan characteristics, high-voltage characteristics, and the like of secondary batteries, especially low-temperature output characteristics, based on excellent coating properties and reduction of residual lithium byproducts through the interaction between the respective oxides.

In a specific embodiment, the thickness of the coating layer may be 0.01 to 1 μm, preferably 0.1 to 0.5 μm. When the thickness of the coating layer is excessively small, undesirably, it may be difficult to expect an improvement of the desired properties in the present invention, and when the thickness is excessively great, undesirably, it may act as a factor that hinders the movement of lithium, and may act as a resistance in the battery, which is problematic.

Further, it is preferred that the coating layer be applied at a surface area of at least 40% based on the surface area of the core in order to remarkably improve the properties according to the present invention.

The present invention also provides a method of preparing the cathode active material. Specifically, the preparation method according to the present invention includes mixing a tungsten-containing powder, a boron-containing powder and a phosphorus-containing powder with a lithium composite metal oxide powder for a core, or mixing a tungsten-containing powder, a boron-containing powder, a phosphorus-containing powder and a lithium-containing powder with a lithium composite metal oxide powder for a core, followed by firing in an atmosphere containing oxygen in a temperature range within which an amorphous coating layer is formed.

That is, according to the preparation method of the present invention, raw materials are mixed as a powder, rather than a solvent-based slurry, suspension, or solution, followed by firing. As a result, it is possible to prevent the reaction between the raw materials in the presence of a solvent, and to achieve the effects of improving preparation workability and reducing preparation costs because solvents are not used. The tungsten-containing powder may be tungsten oxide (e.g., $WO_3$) itself to be contained in the coating layer, but may be other tungsten compounds that may be converted to tungsten oxides through oxidation in some cases. Examples of such other tungsten compounds include, but are not limited to, $H_2WO_4$, $(NH_4)_{10}(H_2W_{12}O_{42}) \cdot XH_2O$, and $(NH_4)_6H_2W_{12}O_{40} \cdot XH_2O$ (wherein X is 1 to 5).

The boron-containing powder may be boron oxide (e.g., $B_2O_3$) itself to be contained in the coating layer, but may be other boron compounds that may be converted to boron oxides through oxidation in some cases. Examples of such other boron compounds include, but are not limited to, $H_3BO_3$ and $HBPO_4$.

The phosphorus-containing powder may be phosphorus oxide (e.g., $P_2O_5$) itself to be contained in the coating layer, but may be other phosphorus compounds that may be converted to phosphorus oxides through oxidation in some cases. Examples of such other phosphorus compounds include, but are not limited to, $(NH_4)H_2PO_4$, $(NH_4)_2HPO_4$, $(NH_4)_3PO_4$, and the like. $(NH_4)H_2PO_4$ has a low melting point and thus melts on the surface of the core during firing and then solidifies again while being oxidized to thereby form a coating layer.

The lithium-containing powder may be lithium oxide itself to be contained in the coating layer, but may be other lithium compounds that may be converted to lithium oxides through oxidation in some cases. Examples of such lithium compounds include LiOH, $Li_2CO_3$, $LiNO_3$, $Li_2SO_4$ and the like.

In particular, the lithium oxide of the amorphous coating layer may be derived from a lithium-containing component present on the surface of the lithium composite metal oxide powder. In some cases, the method may include mixing only a tungsten-containing powder, a boron-containing powder, and a phosphorus-containing material with a lithium composite metal oxide powder, followed by firing.

The temperature range within which the amorphous coating layer is formed may vary slightly depending on the type and content requirements of the raw materials, and may be, for example, higher than 150° C. and not higher than 500° C., preferably not lower than 200° C. and not higher than 500° C., more preferably not lower than 300° C. and not higher than 450° C. When the firing temperature is excessively low, adhesion of the oxides to the surface of the core may be deteriorated. Conversely, when the firing temperature is excessively high, undesirably, the coating layer is crystallized, and it may be difficult to uniformly coat the surface of the core.

The firing time may be within the range of about 2 to about 20 hours.

Raw material powders such as tungsten-containing powder and boron-containing powder preferably have an average particle diameter of about 0.01 to about 5 μm so that they can be uniformly adsorbed on the surface of the core without causing agglomeration between particles when mixing the core with the raw materials for the production of the cathode active material. They are partially or completely melted during the firing process and transformed into an amorphous phase to form a coating layer having the thickness defined above.

When firing is performed under the conditions described above, lithium oxide, tungsten oxide, boron oxide and phosphorus oxide form an amorphous coating layer, thereby increasing the coating area and uniformity and thus increasing scalability when coating the surface of the core. Accordingly, as described above, the tungsten oxide also becomes an amorphous phase, so the RCT resistance decreases, and a phenomenon in which the tungsten oxide is separated from the core and is present or aggregated due to the crystalline phase is suppressed. In addition, coating uniformity of lithium oxide, boron oxide, and the like, which are ion conductors, can be also increased, and tungsten oxide can be easily adhered to the surface due to the excellent coating formability thereof.

The present invention also provides a lithium secondary battery including the cathode active material. The configuration and production method of the lithium secondary battery are known in the art, and thus a detailed description thereof will be omitted herein.

Effects of the Invention

As described above, the cathode active material according to the present invention includes a specific amorphous coating layer on the surface of the core, and is thus capable of suppressing a phenomenon in which a coating material is crystallized and is present separately outside the core, not on the surface of the core, securing a uniform and large coating area, and remarkably reducing the amount of lithium byproducts remaining on the surface of the core, thereby exerting effects of greatly improving the lifespan characteristics, high-voltage characteristics and the like of the secondary battery, especially the output characteristics thereof at low temperatures.

BEST MODE

Now, the present invention will be described in more detail with reference to the following examples. These examples should not be construed as limiting the scope of the present invention.

Example 1

(Preparation of Cathode Active Material)

$B_2O_3$, $WO_3$ and $NH_4H_2PO_4$ were mixed in the amounts shown in Table 1 below with 100 parts by weight of lithium composite metal oxide $(Li(Ni_{0.82}Co_{0.11}Mn_{0.7})_{0.994}Ti_{0.004}Zr_{0.002}O_2)$ using a dry mixer, followed by heat treatment in an air atmosphere at 400° C. for 7 hours, to prepare a cathode active material having a surface treatment layer (coating layer) containing glassy oxide shown in Table 1 below.

Lithium oxide was produced by oxidation of lithium byproducts remaining on the surface of the lithium composite metal oxide, and it was ascertained that about 0.20 parts by weight to about 0.25 parts by weight of lithium oxide (Li$_2$O) was formed by oxidation during heat treatment.

(Production of Anode)

The cathode active material prepared above, Super-P as a conducting material, and PVdF as a binder were mixed at a weight ratio of 95:2:3 in the presence of N-methylpyrrolidone as a solvent to prepare a paste for forming a cathode. The paste for forming a cathode was applied onto an aluminum current collector, dried at 130° C., and then rolled to produce a cathode.

(Production of Lithium Secondary Battery)

Porous polyethylene as a separator was interposed between the cathode prepared above and an anode as a Li metal to produce an electrode assembly, the electrode assembly was placed in a cell case, and an electrolyte was injected into the cell case to produce a lithium secondary battery. At this time, the electrolyte was prepared by dissolving 1.0M lithium hexafluorophosphate (LiPF$_6$) in an organic solvent consisting of ethylene carbonate/dimethyl carbonate (mixed at a volume ratio of EC/DMC=1/1).

Example 2

An electrode was produced and a lithium secondary battery was produced under the same conditions as in Example 1, except that the heat-treatment temperature was 500° C.

Example 3

An electrode was produced and a lithium secondary battery was produced under the same conditions as in Example 1, except that the heat-treatment temperature was 350° C.

Example 4

An electrode was produced and a lithium secondary battery was produced under the same conditions as in Example 1, except that (Li(Ni$_{0.35}$Co$_{0.37}$Mn$_{0.28}$)$_{0.994}$Ti$_{0.004}$Zr$_{0.002}$O$_2$ was used as the lithium composite metal oxide.

Example 5

An electrode was produced and a lithium secondary battery was produced under the same conditions as in Example 1, except that (Li(Ni$_{0.50}$Co$_{0.20}$Mn$_{0.30}$)$_{0.994}$Ti$_{0.004}$Zr$_{0.002}$O$_2$ was used as the lithium composite metal oxide.

Example 6

An electrode was produced and a lithium secondary battery was produced under the same conditions as in Example 1, except that (Li(Ni$_{0.60}$Co$_{0.20}$Mn$_{0.20}$)$_{0.994}$Ti$_{0.004}$Zr$_{0.002}$O$_2$ was used as the lithium composite metal oxide.

Example 7

An electrode was produced and a lithium secondary battery was produced under the same conditions as in Example 1, except that (Li(Ni$_{0.70}$Co$_{0.15}$Mn$_{0.15}$)$_{0.994}$Ti$_{0.004}$Zr$_{0.002}$O$_2$ was used as the lithium composite metal oxide.

Comparative Example 1

An electrode was produced and a lithium secondary battery was produced under the same conditions as in Example 1, except that B$_2$O$_3$, WO$_3$ and NH$_4$H$_2$PO$_4$ were not mixed.

Comparative Example 2

An electrode was produced and a lithium secondary battery was produced under the same conditions as in Example 1, except that the firing temperature was 550° C.

Comparative Example 3

An electrode was produced and a lithium secondary battery was produced under the same conditions as in Example 1, except that the firing temperature was 150° C.

Comparative Example 4

An electrode was produced and a lithium secondary battery was produced under the same conditions as in Example 4, except that B$_2$O$_3$, WO$_3$ and NH$_4$H$_2$PO$_4$ were not mixed.

Comparative Example 5

An electrode was produced and a lithium secondary battery was produced under the same conditions as in Example 5, except that B$_2$O$_3$, WO$_3$ and NH$_4$H$_2$PO$_4$ were not mixed.

Comparative Example 6

An electrode was produced and a lithium secondary battery was produced under the same conditions as in Example 6, except that B$_2$O$_3$, WO$_3$ and NH$_4$H$_2$PO$_4$ were not mixed.

Comparative Example 7

An electrode was produced and a lithium secondary battery was produced under the same conditions as in Example 7, except that B$_2$O$_3$, WO$_3$ and NH$_4$H$_2$PO$_4$ were not mixed.

Experimental Example 1

For the cathode active materials prepared in Examples 1 to 7 and Comparative Examples 1 to 7, the amount of lithium byproducts remaining on the surface of the core was measured using CS analysis (model name: ELTRA CS 2000) and HCl titration, and the result is shown in Table 1 below. For reference, a detailed description of the HCl titration is given below.

The amount of lithium remaining in the prepared cathode active material is a value (TTL, total lithium) obtained by separately calculating the total amount of Li alone after measuring remaining amounts of Li-containing compounds (for example, LiOH or Li$_2$CO$_3$) by potential difference neutralization titration. The calculation is performed in accordance with Equation 1 below.

$$\text{TTL (Total Li)} = \text{LiOH assay value (\%)} * \text{Li/LiOH} + \text{Li}_2\text{CO}_3 \text{ assay value (\%)} * 2\text{Li/Li}_2\text{CO}_3 = \text{LiOH assay value (\%)} * 0.29 + \text{Li}_2\text{CO}_3 \text{ assay value (\%)} * 0.188 \qquad [\text{Equation 1}]$$

Experimental Example 2

For the lithium secondary batteries each prepared in Examples 1 to 7 and Comparative Examples 1 to 7, 2 cycles of 0.1C charging and 0.1C discharging were performed while cutting off 3.0V upon discharging after charging 4.3 V at room temperature for electrode stabilization. Then, charging at 0.2C and discharging at 0.2C and 2.0C were performed at −25° C. in order to evaluate the low-temperature output characteristics. Based on the output measured at 0.2C at −25° C., rate retention (%) of the output measured at 2.0C was calculated and is shown in Table 1 below.

TABLE 1

| Item | Core composition (Ni:Co:Mn) | WO$_3$ (parts by weight) | B$_2$O$_3$ (parts by weight) | NH$_4$H$_2$PO$_4$ (parts by weight) | Heat-treatment temperature (° C.) | Residual lithium (TTL) (parts by weight) | Rate retention (%, −25° C.)) |
|---|---|---|---|---|---|---|---|
| Ex. 1 | 82:11:7 | 0.375 | 0.15 | 0.75 | 400 | 0.216 | 78.8 |
| Ex. 2 | 82:11:7 | 0.375 | 0.15 | 0.75 | 500 | 0.180 | 76.9 |
| Ex. 3 | 82:11:7 | 0.375 | 0.15 | 0.75 | 350 | 0.109 | 76.2 |
| Ex. 4 | 35:37:28 | 0.375 | 0.15 | 0.75 | 400 | 0.007 | 77.8 |
| Ex. 5 | 50:20:30 | 0.375 | 0.15 | 0.75 | 400 | 0.038 | 76.9 |
| Ex. 6 | 60:20:20 | 0.375 | 0.15 | 0.75 | 400 | 0.062 | 76.8 |
| Ex. 7 | 70:15:15 | 0.375 | 0.15 | 0.75 | 400 | 0.082 | 76.1 |
| Comp. Ex. 1 | 82:11:7 | — | — | — | — | 0.330 | 64.0 |
| Comp. Ex. 2 | 82:11:7 | 0.375 | 0.15 | 0.75 | 550 | 0.189 | 71.2 |
| Comp. Ex. 3 | 82:11:7 | 0.375 | 0.15 | 0.75 | 150 | 0.253 | 70.1 |
| Comp. Ex. 4 | 35:37:28 | — | — | — | 400 | 0.231 | 64.0 |
| Comp. Ex. 5 | 50:20:30 | — | — | — | 400 | 0.322 | 63.9 |
| Comp. Ex. 6 | 60:20:20 | — | — | — | 400 | 0.351 | 65.2 |
| Comp. Ex. 7 | 70:15:15 | — | — | — | 400 | 0.323 | 64.6 |

As can be seen from Table 1 above, the cathode active materials of Examples 1 to 7 according to the present invention exhibit remarkably reduced amounts of lithium remaining on the surface compared to the cathode active materials of Comparative Examples 1 to 7. As a result, the cathode active materials of Examples 1 to 7 can remarkably improve the lifespan characteristics and high-voltage characteristics of the lithium secondary batteries.

In addition, the lithium secondary batteries of Examples 1 to 7 according to the present invention exhibit excellent output characteristics under low-temperature conditions and particularly excellent output characteristics under high-rate discharge conditions (2.0C discharge) compared to the lithium secondary batteries of Comparative Examples 1 to 7.

The reason for this is considered to be that the specific coating layer according to the present invention secures a conductive path of lithium ions to promote movement of the lithium ions and at the same time increases an electrical conductivity (lithium ion conductor).

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A cathode active material for a lithium secondary battery comprising:
   a core containing lithium composite metal oxide; and
   a coating layer disposed on the core, containing a mixture of lithium oxide, tungsten oxide, boron oxide and phosphorus oxide, and having an amorphous phase.

2. The cathode active material according to claim 1, wherein the lithium composite metal oxide has a layered crystal structure including one or more transition metals.

3. The cathode active material according to claim 1, wherein the lithium composite metal oxide is a substance represented by the following Formula 1:

$$Li[Li_xM_{1-x-y}D_y]O_{2-a}Q_a \qquad (1)$$

wherein M includes at least one transition metal element that is stable in a 4- or 6-coordination structure;
D includes at least one element selected from an alkaline earth metal, a transition metal, and a non-metal as a dopant;
Q includes at least one anion; and
0≤x≤0.1, 0≤y≤0.1, 0≤a≤0.2.

4. The cathode active material according to claim 3, wherein M includes at least two elements selected from the group consisting of Ni, Co, and Mn;
D includes at least one element selected from the group consisting of Al, W, Si, V, B, Ba, Ca, Zr, Ti, Mg, Ta, Nb and Mo; and
Q includes at least one element selected from F, S and P.

5. The cathode active material according to claim 1, wherein the core has an average particle diameter (D50) of 1 to 50 μm.

6. The cathode active material according to claim 1, wherein the coating layer has a composition of the following Formula 2:

$$\alpha W_xO_y\text{-}\beta B_mO_n\text{-}\gamma P_vO_w\text{-}\delta Li_2O \qquad (2)$$

wherein requirements of 0<α≤2, 0<β≤2, 0<γ≤2, 0<δ≤2, and 1≤x≤2, 2≤y≤4, 1≤m≤2, 3≤n≤5, 1≤v≤3, 4≤w≤8 are satisfied.

7. The cathode active material according to claim 1, wherein, based on 100 parts by weight of the core, a content of the lithium oxide in the coating layer is 0.01 to 2 parts by weight, a content of the tungsten oxide in the coating layer is 0.1 to 2 parts by weight, a content of the boron oxide in the coating layer is 0.2 to 2 parts by weight, and a content of the phosphorus oxide in the coating layer is 0.2 to 2 parts by weight.

8. The cathode active material according to claim 1, wherein the coating layer has a thickness of 0.01 to 1 µm.

9. The cathode active material according to claim 1, wherein the coating layer is coated at a surface area of 40 to 100% based on the surface area of the core.

10. A method of preparing the cathode active material according to claim 1, the method comprising:
   (i) mixing a tungsten-containing powder, a boron-containing powder and a phosphorus-containing powder with a lithium composite metal oxide powder for a core, or (ii) mixing a tungsten-containing powder, a boron-containing powder, a phosphorus-containing powder and a lithium-containing powder with a lithium composite metal oxide powder for a core, followed by firing in an atmosphere containing oxygen in a temperature range within which an amorphous coating layer is formed.

11. The method according to claim 10, wherein the method comprises mixing the tungsten-containing powder, the boron-containing powder, and the phosphorus-containing material with the lithium composite metal oxide powder, followed by firing,
   wherein lithium oxide of the amorphous coating layer is derived from a lithium-containing component present on the surface of the lithium composite metal oxide powder.

12. The method according to claim 10, wherein the temperature range is higher than 150° C. and is not higher than 500° C.

13. A lithium secondary battery comprising the cathode active material according to claim 1.

* * * * *